United States Patent [19]
Hung

[11] Patent Number: 5,924,210
[45] Date of Patent: Jul. 20, 1999

[54] SAW HAVING ANGLE ADJUSTING DEVICE

[76] Inventor: Shen Chi Hung, No. 53, Dong San Road, Ching Shui Town, Taichung Hsien, Taiwan

[21] Appl. No.: 09/008,532

[22] Filed: Jan. 16, 1998

Related U.S. Application Data

[51] Int. Cl.⁶ .............................. B27B 21/00; B25G 3/24
[52] U.S. Cl. .............................. 30/519; 30/166.3; 30/342
[58] Field of Search .................. 30/166.3, 296.1, 30/340, 342, 344, 513, 517, 519, 161, 155

[56] References Cited

U.S. PATENT DOCUMENTS

| | | | |
|---|---|---|---|
| 1,638,749 | 8/1927 | Santoyo | 30/166.3 |
| 2,621,689 | 12/1952 | Fordon | 30/519 |
| 2,747,631 | 5/1956 | Behlefeldt | 30/519 |
| 2,762,407 | 9/1956 | McCord, Jr. | 30/519 |

FOREIGN PATENT DOCUMENTS

| 1169428 | 11/1969 | United Kingdom | 30/166.3 |
|---|---|---|---|

*Primary Examiner*—Hwei-Siu Payer

[57] ABSTRACT

A saw includes a handle and a saw blade pivotally coupled to the handle and having two or more orifices. The handle has a spring-biased projection for engaging with the orifices and for securing the saw blade at a selected angular position relative to the handle. A knob is slidably engaged in the handle for disengaging the projection from the orifices and for allowing the saw blade to rotate relative to the handle. The handle has an arch for forming an opening and for engaging with a hand of a user. A panel is slidably engaged in the arch for shielding the opening.

12 Claims, 6 Drawing Sheets

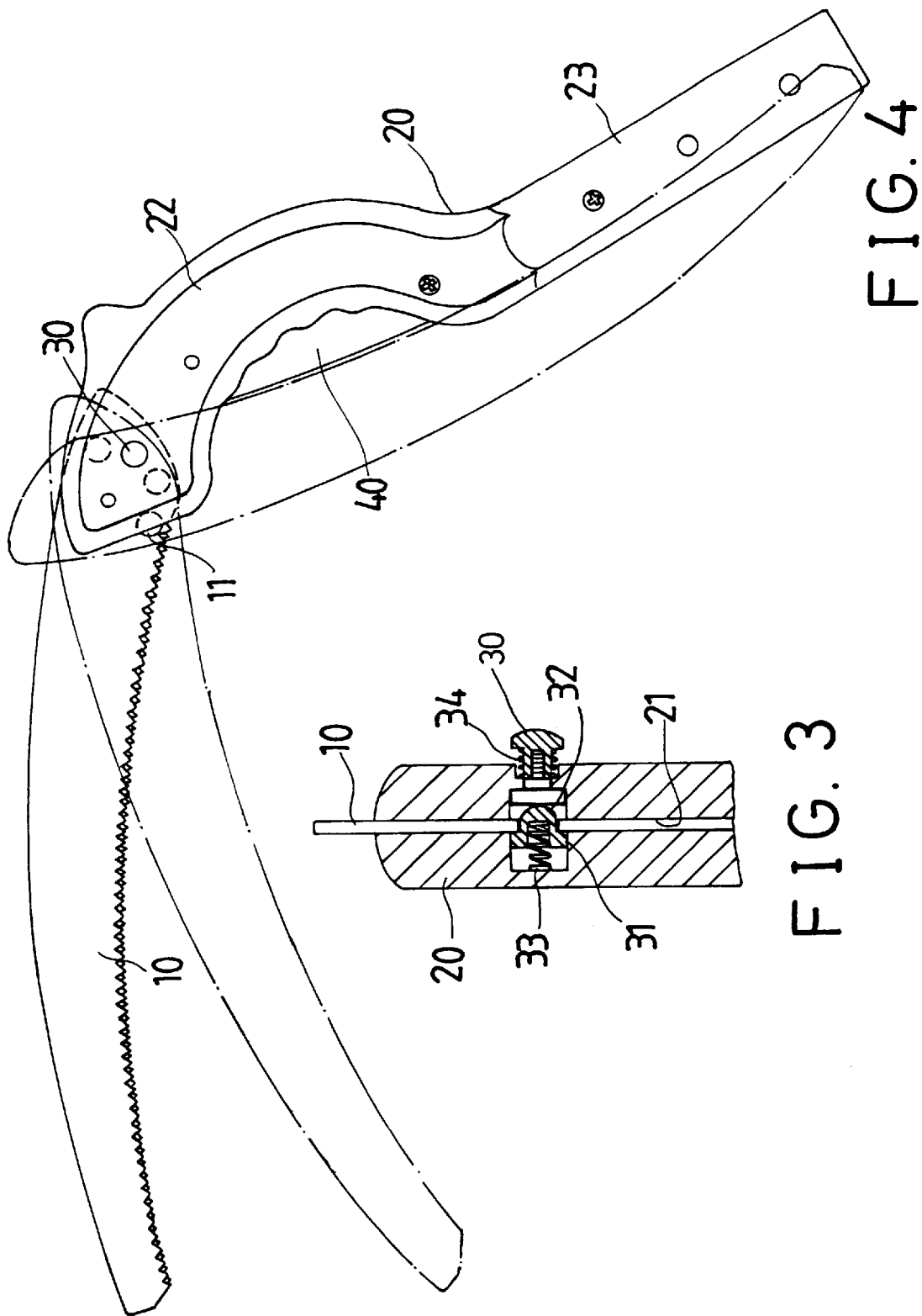

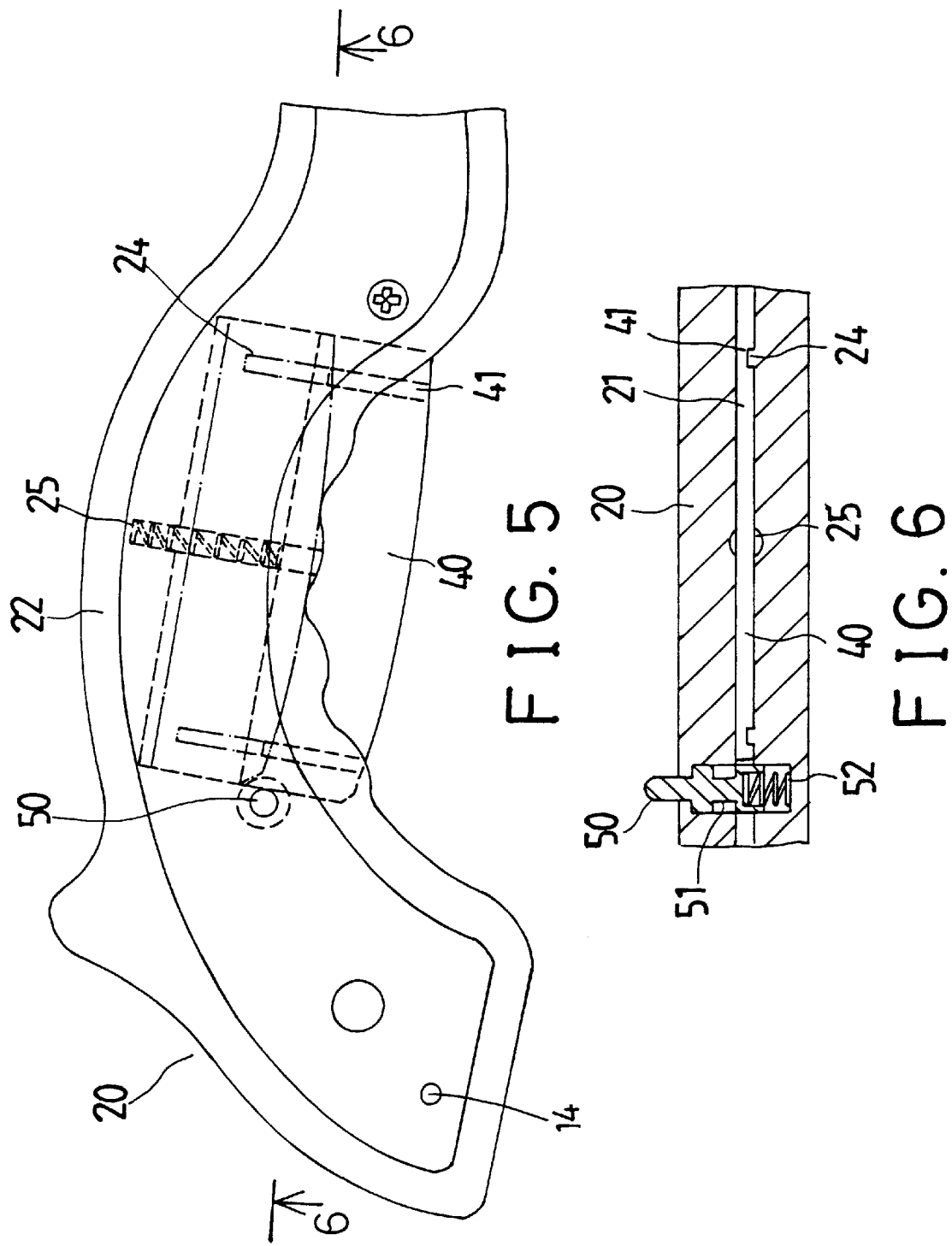

SAW HAVING ANGLE ADJUSTING DEVICE

BACKGROUND OF THE INVENTION

1. Field of the Invention

The present invention relates to a saw, and more particularly to a saw having an adjusting device for adjusting the angular positions of the saw blade relative to the handle.

2. Description of the Prior Art

Typical saws comprise a saw blade pivotally coupled to a handle. However, the saw blade may not be adjusted and secured to different angular positions relative to the handle.

The present invention has arisen to mitigate and/or obviate the afore-described disadvantages of the conventional saws.

SUMMARY OF THE INVENTION

The primary objective of the present invention is to provide a saw which includes an adjusting device for adjusting the angular positions of the saw blade relative to the handle.

In accordance with one aspect of the invention, there is provided a saw comprising a handle including a first end, a saw blade including a first end pivotally coupled to the first end of the handle at an axle for allowing the saw blade to be rotated relative to the handle about the axle, the saw blade including at least two orifices provided around the axle, a spring-biased projection engaged in the handle and adapted to engage with the orifices of the saw blade for securing the saw blade at a selected angular position relative to the handle, and means for disengaging the spring-biased projection from the orifices. The saw blade is allowed to rotate relative to the handle when the spring-biased projection is disengaged from a first of the orifices of the handle, for allowing the spring-biased projection to engage with a second of the orifices and for allowing the saw blade to be adjusted to any selected or desired angular position relative to the handle.

The handle includes an arch for defining an opening and for engaging with a hand of a user and for facilitating the holding of the handle. A shielding means is provided for shielding the opening and for preventing the user from being hurt by the saw blade inadvertently. The opening shielding means includes a panel slidably engaged in the arch, and means for biasing the panel inward of the opening. A stop means is provided for engaging with the panel and for disengaging the panel from the opening. The arch includes a channel for slidably receiving the panel, the stop means includes a stop member slidably engaged in the handle and includes a biasing means for biasing the stop member to engage with the panel and for preventing the panel from being engaged into the opening. The stop member includes an annular slot for communicating with the channel and for aligning with the panel and for allowing the panel to engage into the opening.

The handle includes a second end having a hole, the saw further includes an extension having a first end engaged into the hole of the handle for increasing the length of the handle and for allowing the saw blade to engage with and to saw the tree branch located at the higher position.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is a cross sectional view taken along lines 3—3 of FIG. 1;

FIG. 4 is a plan view illustrating the operation of the saw;

FIG. 5 is a partial plan view of the saw;

FIG. 6 is a partial cross sectional view taken along lines 6—6 of FIG. 5; and

DETAILED DESCRIPTION OF THE PREFERRED EMBODIMENT

Figure 1:
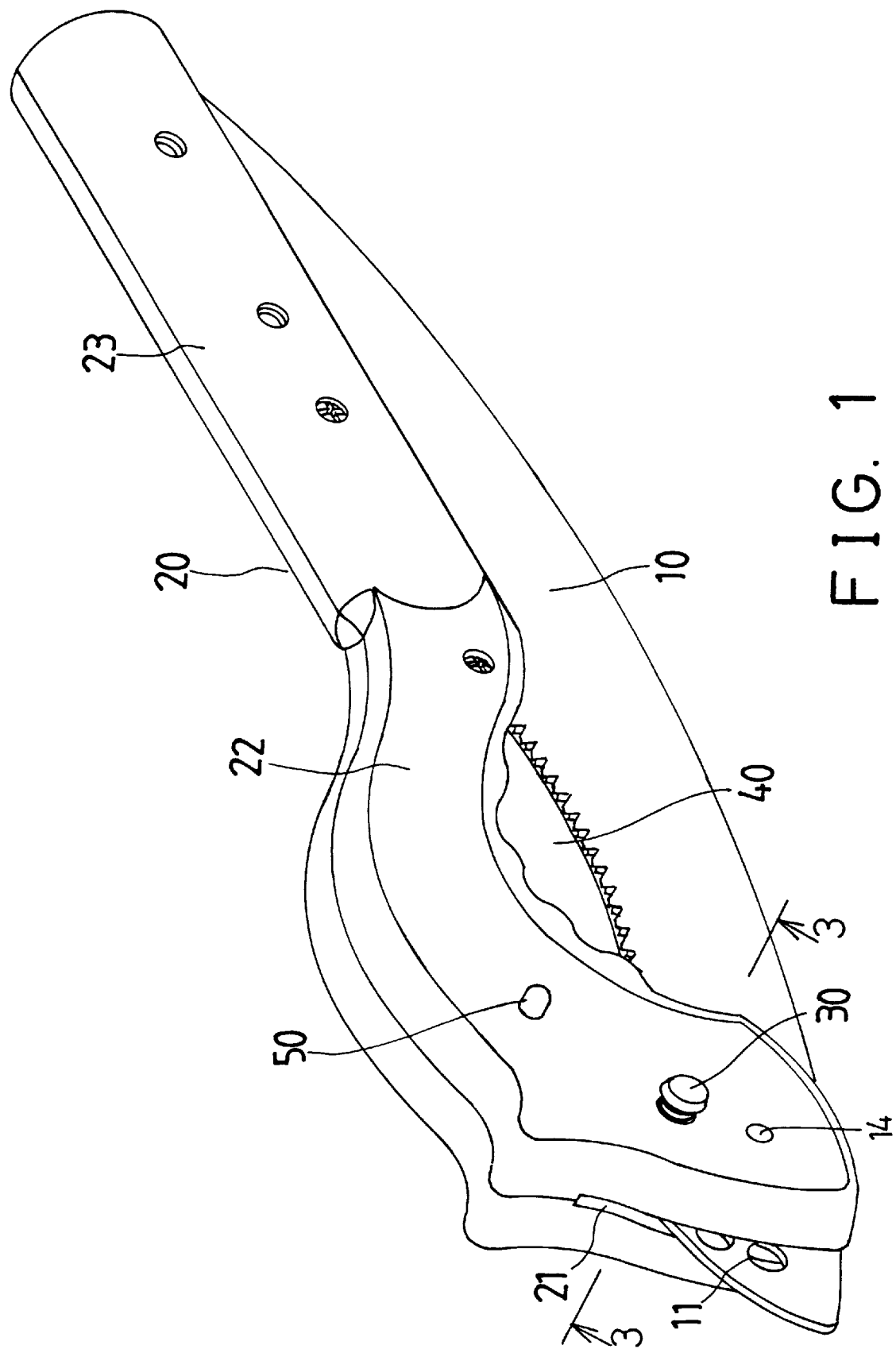
FIG. 1 is a perspective view of a saw in accordance with the present invention.
Figure 2:
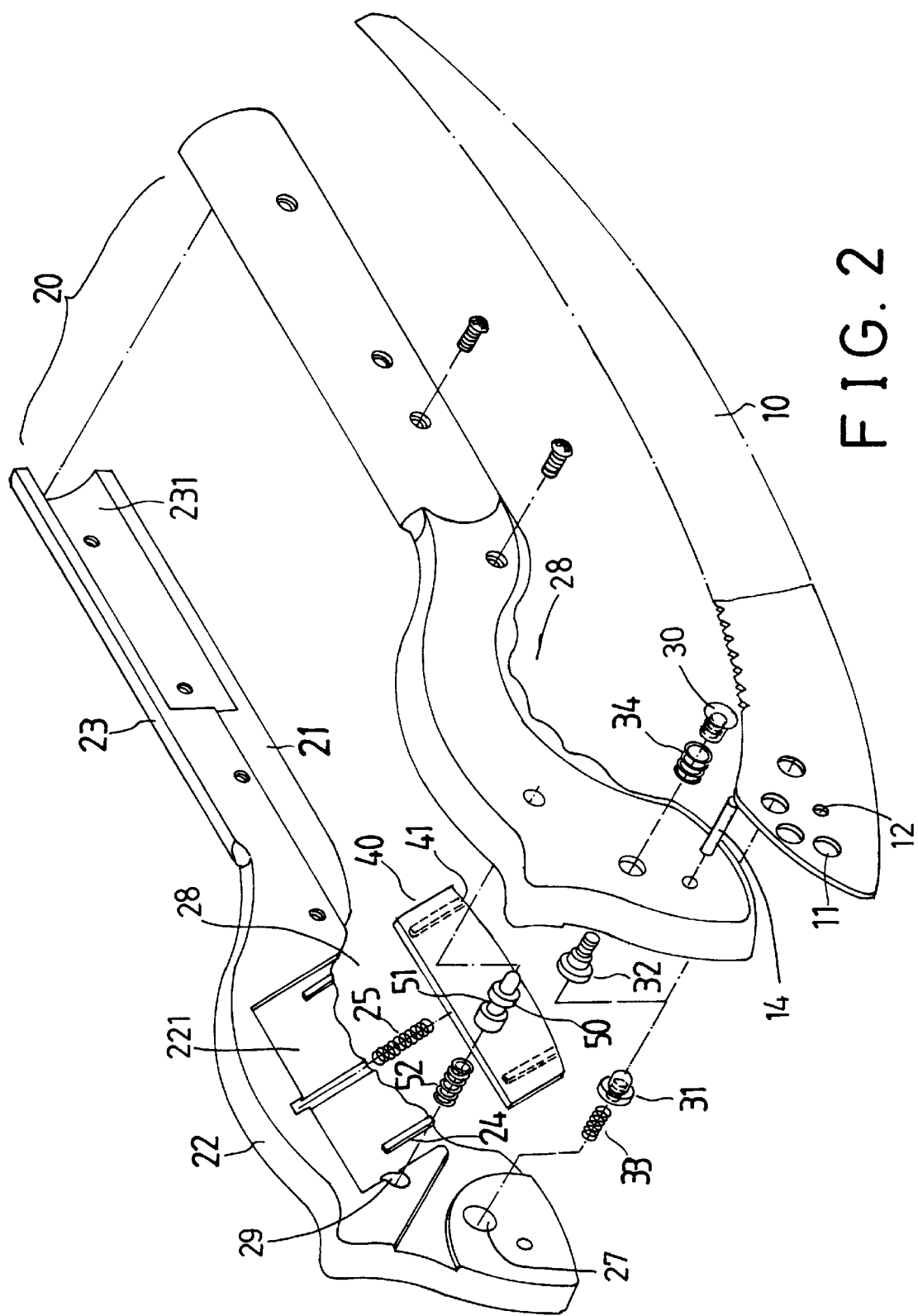
FIG. 2 is an exploded view of the saw.
Figure 7:
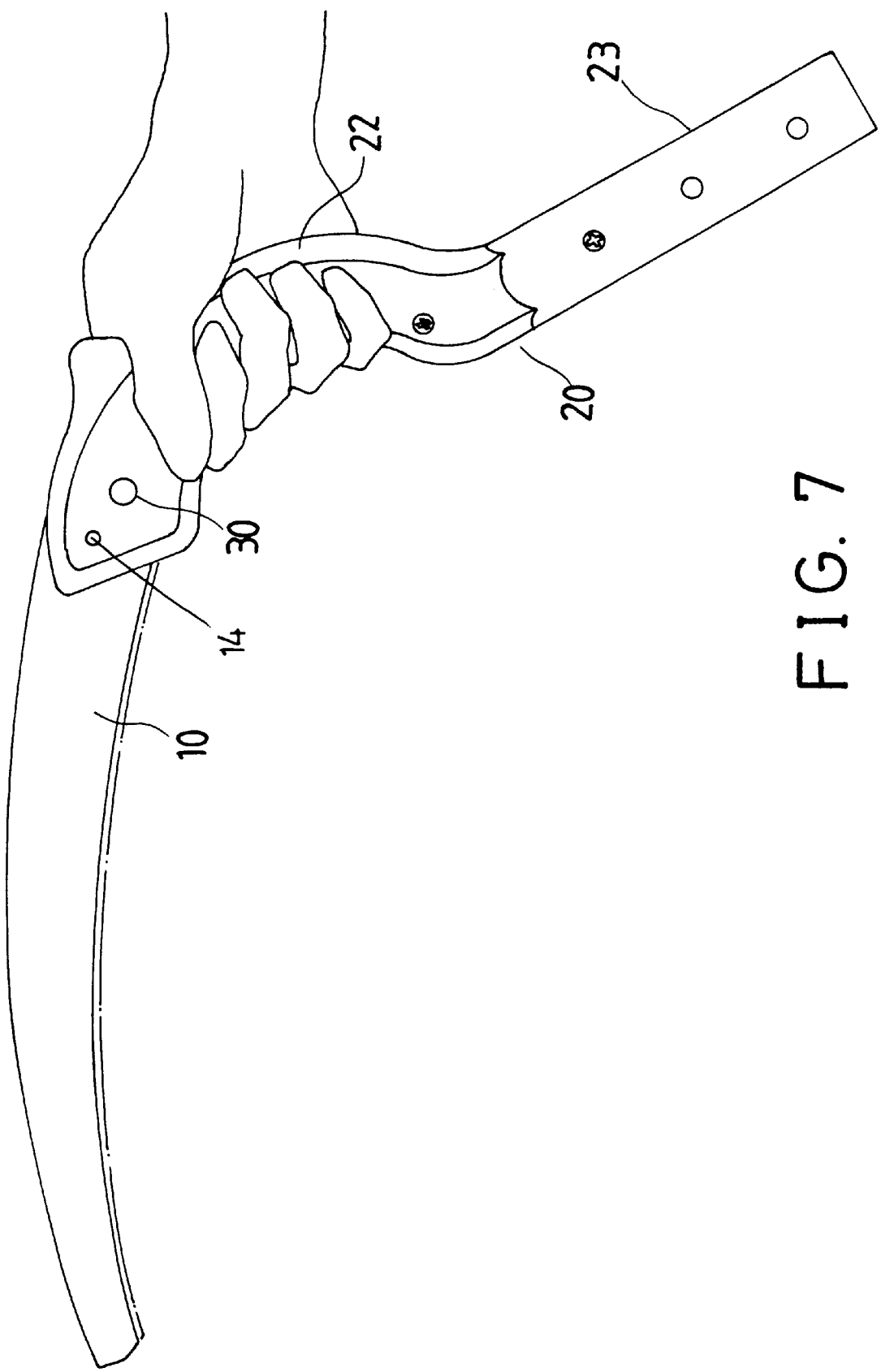
FIGS. 7 and 8 are plan views illustrating the operation of the saw.
Figure 8:
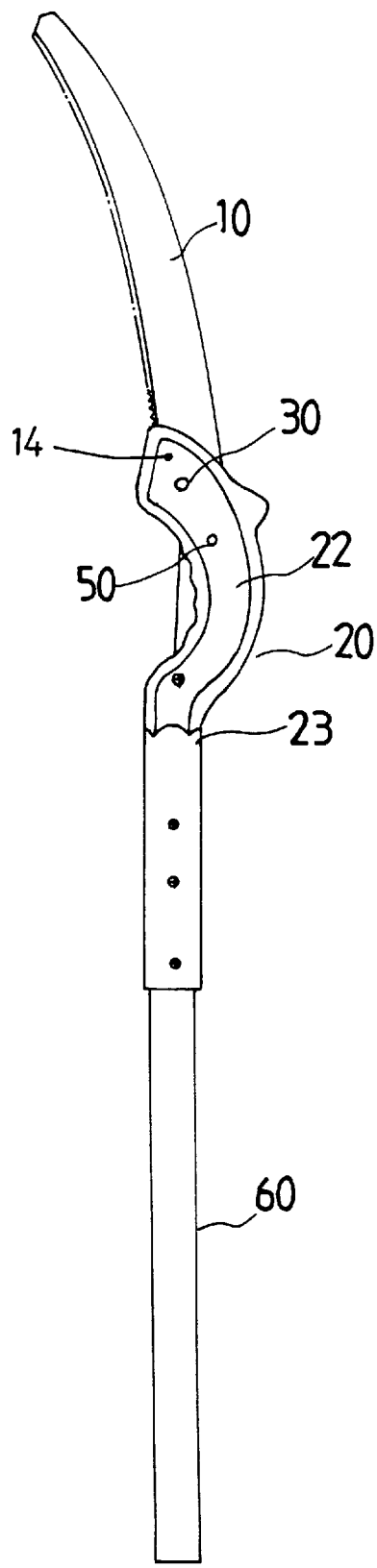

Referring to the drawings, and initially to FIGS. 1–4, a saw in accordance with the present invention comprises a handle 20 including an arch 22 for forming an opening 28 and for engaging with the fingers of the user (FIG. 7). The handle 20 preferably includes two halves secured together and includes an arm 23 extended rearward and having a hole 231 (FIG. 2) for securing an extension 60 (FIG. 8) and for increasing the length of the handle. A saw blade 10 has one end pivotally coupled to the handle 20 by an axle 14 which is engaged through an aperture 12 of the saw blade 10. The saw blade 10 includes a number of orifices 11 provided around the aperture 12 and the axle 14. The handle 20 includes a slit 21 for engaging with a portion of the saw blade 10 (FIGS. 2, 4).

A projection 31 is slidably engaged in a cavity 27 of the handle 20 and a spring 33 is engaged with the projection 31 for forming a spring-biased projection and for biasing the projection 31 to engage with either of the orifices 11 of the saw blade 10 and for securing the saw blade 10 to the handle 20 at any suitable and selected angular position. A slide 32 is slidably engaged in the handle 20 and is engaged with the projection 31. A knob 30 is secured to the slide 32 by such as threaded engagement for allowing the knob 30 to be moved in concert with the slide 32. A spring 34 is engaged between the handle 20 and the knob 30 for biasing the knob 30 outward of the handle 20. The projection 31 may be disengaged from the saw blade 10 by depressing the knob 30 and the slide 32 against the springs 33, 34, for allowing the saw blade 10 to be rotated relative to the handle 20 until the projection 31 is engaged with another orifice 11 of the saw blade.

The arch 22 of the handle 20 includes a channel 221 for slidably receiving a panel 40 and includes one or more guide ribs 24 for slidably engaging with the grooves 41 of the panel 40 and for guiding the relative movement of the panel 40 relative to the handle 20. A spring 25 is engaged with the panel 40 for biasing the panel 40 inward of the opening 28 and for blocking the opening 28 (FIG. 1) and for preventing the fingers of the user from engaging into the opening 28. The fingers of the user may be hurt by the saw blade 10 when the fingers are engaged into the opening 28 and when the saw blade 10 is folded to engage with the handle 20.

The handle 20 includes a puncture 29 for slidably receiving a stop 50 (FIGS. 2, 5, 6) which includes an annular slot 51 for engaging with the panel 40 and for allowing the panel 40 to be moved into the opening 28. A spring 52 is engaged with the stop 50 for biasing the stop 50 to engage with the panel 40 and for preventing the panel 40 from moving into the opening 28 and for allowing the fingers of the user to engage into the opening 28. When the stop 50 is moved against the spring 52 in order to align the annular slot 51 with the panel 40, the panel 40 is then allowed to move into the opening 28 for blocking the opening 28.

In operation, as shown in FIG. 4, the saw blade 10 may be easily adjusted to the desired angular position relative to the handle 20 by engaging the spring-biased projection 31 with one of the orifices 11. The extension 60 may be secured to the arm 23 for allowing the saw blade 10 to be elevated to cut the branches at a higher level. The panel 40 may be engaged into the opening 28 for blocking the opening 28 and for preventing the fingers of the user from engaging into the opening 28 and for preventing the fingers of the user from being hurt by the saw blade 10.

Accordingly, the saw in accordance with the present invention includes an adjusting device for adjusting the angular positions of the saw blade relative to the handle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saw comprising:

a handle including a first end, said handle including an arch for defining an opening and for engaging with a hand of a user, means for shielding said opening, a saw blade including a first end pivotally coupled to said first end of said handle at an axle for allowing said saw blade to be rotated relative to said handle about said axle, said saw blade including at least two orifices provided around said axle, a spring-biased projection engaged in said handle and adapted to engage with said at least two orifices of said saw blade for securing said saw blade at a selected angular position relative to said handle, and means for disengaging said spring-biased projection from said at least two orifices, said saw blade being allowed to rotate relative to said handle when said spring-biased projection is disengaged from a first of said at least two orifices of said handle, for allowing said spring-biased projection to engage with a second of said at least two orifices.

2. The saw according to claim 1, wherein said opening shielding means includes a panel slidably engaged in said arch, and means for biasing said panel inward of said opening.

3. The saw according to claim 2 further comprising a stop means for engaging with said panel and for disengaging said panel from said opening.

4. The saw according to claim 3, wherein said arch includes a channel for slidably receiving said panel, said stop means includes a stop member slidably engaged in said handle and includes a biasing means for biasing said stop member to engage with said panel and for preventing said panel from being engaged into said opening.

5. The saw according to claim 4, wherein said stop member includes an annular slot for communicating with said channel and for aligning with said panel and for allowing said panel to engage into said opening.

6. The saw according to claim 1, wherein said handle includes a second end having a hole, said saw further includes an extension having a first end engaged into said hole of said handle for increasing a length of said handle.

7. A saw comprising:

a handle including a first end having an arch for defining an opening and for engaging with a hand of a user, a saw blade including a first end pivotally coupled to said first end of said handle at an axle for allowing said saw blade to be rotated relative to said handle about said axle, and means for shielding said opening.

8. The saw according to claim 7, wherein said opening shielding means includes a panel slidably engaged in said arch, and means for biasing said panel inward of said opening.

9. The saw according to claim 8 further comprising a stop means for engaging with said panel and for disengaging said panel from said opening.

10. The saw according to claim 9, wherein said arch includes a channel for slidably receiving said panel, said stop means includes a stop member slidably engaged in said handle and includes a biasing means for biasing said stop member to engage with said panel and for preventing said panel from being engaged into said opening.

11. The saw according to claim 10, wherein said stop member includes an annular slot for communicating with said channel and for aligning with said panel and for allowing said panel to engage into said opening.

12. The saw according to claim 7, wherein said saw blade includes at least two orifices provided around said axle, said handle includes a spring-biased projection adapted to engage with said at least two orifices of said saw blade for securing said saw blade at a selected angular position relative to said handle.

* * * * *